United States Patent
Mase

(10) Patent No.: US 8,962,144 B2
(45) Date of Patent: Feb. 24, 2015

(54) REINFORCING SHEET FOR RESIN MOLDED PRODUCT, AND STRUCTURE AND METHOD FOR REINFORCING RESIN MOLDED PRODUCT

(75) Inventor: Takuya Mase, Osaka (JP)

(73) Assignee: Nitto Denko Corporation, Osaka (JP)

( * ) Notice: Subject to any disclaimer, the term of this patent is extended or adjusted under 35 U.S.C. 154(b) by 132 days.

(21) Appl. No.: 13/614,963

(22) Filed: Sep. 13, 2012

(65) Prior Publication Data

US 2013/0071654 A1  Mar. 21, 2013

(30) Foreign Application Priority Data

Sep. 15, 2011  (JP) ................................. 2011-201814

(51) Int. Cl.
  *B32B 9/04* (2006.01)
  *B32B 27/00* (2006.01)
  *B32B 7/12* (2006.01)
  *B32B 27/08* (2006.01)
  *C09J 5/02* (2006.01)

(52) U.S. Cl.
  CPC . *B32B 7/12* (2013.01); *B32B 27/08* (2013.01); *C09J 5/02* (2013.01)
  USPC ........................................ 428/500; 428/411.1

(58) Field of Classification Search
  None
  See application file for complete search history.

(56) References Cited

U.S. PATENT DOCUMENTS

| 2005/0025955 | A1 | 2/2005 | Kuriu et al. | |
|---|---|---|---|---|
| 2007/0110978 | A1* | 5/2007 | Kawaguchi et al. | ....... 428/292.1 |
| 2011/0143125 | A1 | 6/2011 | Fujii et al. | |

FOREIGN PATENT DOCUMENTS

| JP | 2005-041210 A | 2/2005 |
|---|---|---|
| JP | 2012-076279 A | 4/2012 |
| WO | 2011/115140 A1 | 9/2011 |
| WO | 2012/043275 A1 | 4/2012 |

* cited by examiner

*Primary Examiner* — Sheeba Ahmed

(74) *Attorney, Agent, or Firm* — Jean C. Edwards, Esq.; Edwards Neils PLLC

(57) ABSTRACT

A reinforcing sheet for a resin molded product includes a constraining layer, and a reinforcing layer laminated on the constraining layer. After being stuck to a polypropylene plate having a thickness of 2.0 mm and heated at 80° C. for 10 minutes, the reinforcing sheet for a resin molded product has a bending strength at a displacement of 1 mm at 90° C. which is not less than double a bending strength of the polypropylene plate having a thickness of 2.0 mm at a displacement of 1 mm at 90° C.

13 Claims, 1 Drawing Sheet

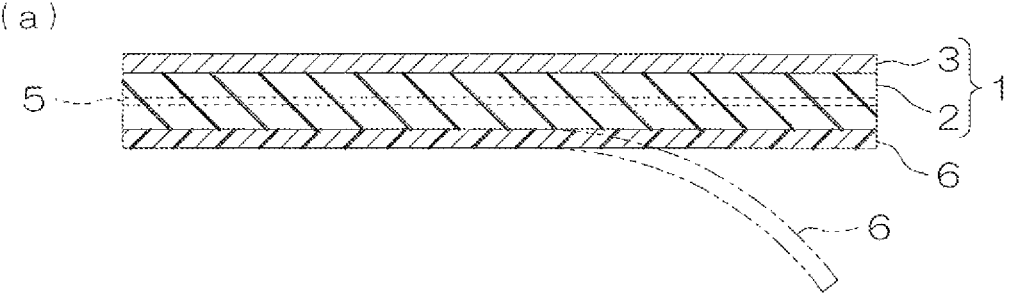
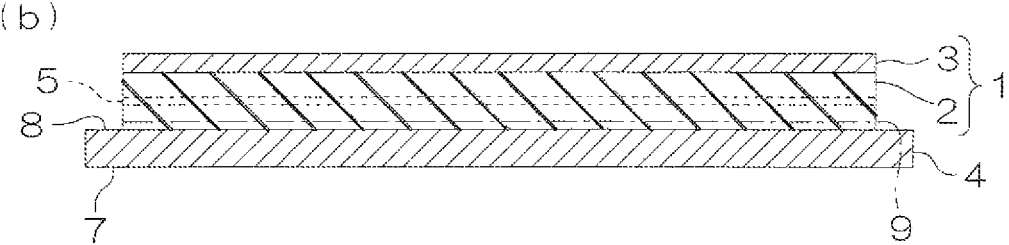

REINFORCING SHEET FOR RESIN MOLDED PRODUCT, AND STRUCTURE AND METHOD FOR REINFORCING RESIN MOLDED PRODUCT

CROSS-REFERENCE TO RELATED APPLICATION

The present application claims priority from Japanese Application No. 2011-201814 filed on Sep. 15, 2011, the content of which is herein incorporated by reference in its entirety.

BACKGROUND OF THE INVENTION

1. Field of the Invention

The present invention relates to a reinforcing sheet for resin molded product, and a structure and method for reinforcing a resin molded product, and particularly to a reinforcing sheet for a resin molded product, and a structure and method for reinforcing a resin molded product using the same.

2. Description of the Related Art

Conventionally, resin plates or steel plates used in various industrial products have been each processed into a thin plate shape to reduce the weight of each of the products.

Therefore, in an attempt to reinforce the thin resin plate, it has been known to, e.g., provide ribs on the inner side of the resin plate.

Also, in an attempt to reinforce the thin steel plate, it has been known to, e.g., provide a steel-plate reinforcing sheet on the inner side of the steel plate.

For example, it is proposed that, after a steel-plate reinforcing sheet including a constraining layer, and a reinforcing layer made of a foam composition is stuck to the vehicle-body steel plate of an automobile, the reinforcing layer is foamed and cured using heat at a high temperature (in a range of, e.g., 160 to 200° C.) during electrodeposition coating to reinforce the vehicle-body steel plate of the automobile (see, e.g., Japanese Unexamined Patent No. 2005-41210).

SUMMARY OF THE INVENTION

However, the ribs are typically molded integrally with a resin plate so that, during the molding thereof, sinks occur in the surfaces of the portions of the resin plate which are reinforced by the ribs. This results in the problem of impaired outer appearance of the resin plate.

When reinforcement is effected using the steel-plate reinforcing sheet described in Japanese Unexamined Patent No. 2005-41210, the reinforcing layer of the steel-plate reinforcing sheet needs to be heated to 160 to 200° C. to be cured. However, if such a steel-plate reinforcing sheet is stuck to the resin plate and heated to 160 to 200° C., a problem arises that the resin plate is degraded or melted.

In addition, after being stuck to a resin plate or steel plate, the reinforcing sheet including the steel-plate reinforcing sheet may be placed together therewith in an atmosphere at a high temperature (of a level at which the resin plate is not melted) and, in that case also, the reinforcing sheet including the steel-plate reinforcing sheet is desired to retain an excellent reinforcing ability.

An object of the present invention is to provide a reinforcing sheet for a resin molded product and a structure and method for reinforcing a resin molded product with which it is possible to maintain a light weight and excellent outer appearance, easily reinforce a resin molded product while preventing the resin molded product from being degraded or melted, and also maintain an excellent reinforcing ability in an atmosphere at a high temperature of a level at which the resin molded product is not melted.

A reinforcing sheet for a resin molded product of the present invention includes a constraining layer, and a reinforcing layer laminated on the constraining layer, wherein, after being stuck to a polypropylene plate having a thickness of 2.0 mm and heated at 80° C. for 10 minutes, the reinforcing sheet for a resin molded product has a bending strength at a displacement of 1 mm at 90° C. which is not less than double a bending strength of the polypropylene plate having a thickness of 2.0 mm at a displacement of 1 mm at 90° C.

In the reinforcing sheet for a resin molded product of the present invention, it is preferable that, after being stuck to the polypropylene plate having a thickness of 2.0 mm and heated at 80° C. for 10 minutes, the reinforcing sheet for a resin molded product has a bending strength at a displacement of 1 mm at 60 to 90° C. which is not less than triple a bending strength of the polypropylene plate having a thickness of 2.0 mm at a displacement of 1 mm at 60 to 90° C.

In the reinforcing sheet for a resin molded product of the present invention, it is also preferable that, after the reinforcing layer is stuck to the polypropylene plate at a room temperature, the reinforcing sheet for a resin molded product has an adhesive force to the propylene plate which is measured by a 90° peel test according to JIS Z0237 (2009) at a peeling speed of 300 mm/min to be not less than 3.0 N/25 mm.

In the reinforcing sheet for a resin molded product of the present invention, it is also preferable that, after the reinforcing layer is stuck to the polypropylene plate at a room temperature and heating is performed at 80° C. for 10 minutes, the reinforcing sheet for a resin molded product has an adhesive force to the propylene plate which is measured by a 90° peel test according to JIS Z0237 (2009) at a peeling speed of 300 mm/min to be not less than 10.0 N/25 mm.

In the reinforcing sheet for a resin molded product of the present invention, it is also preferable that the reinforcing layer is formed of a thermoplastic adhesive composition, the adhesive composition contains a hydrogenated product of a polymer of a monomer containing a conjugated diene, the adhesive composition further contains polyolefin, and a blending ratio of the polyolefin based on 100 parts by mass of the hydrogenated product is in a range of 10 to 200 parts by mass.

In the reinforcing sheet for a resin molded product of the present invention, it is also preferable that the adhesive composition further contains a tackifier, the tackifier contains an alicyclic saturated hydrocarbon resin, and a blending ratio of the tackifier based on 100 parts by mass of the hydrogenated product is in a range of 40 to 200 parts by mass.

In a structure for reinforcing a resin molded product of the present invention, the foregoing reinforcing sheet for a resin molded product is stuck to a resin molded product to reinforce the resin molded product In the structure for reinforcing a resin molded product of the present invention, it is preferable that the reinforcing sheet for a resin molded product stuck to the resin molded product is heated to a temperature of not less than 80° C. to bring the reinforcing sheet for a resin molded product into tight adhesive contact with the resin molded product.

In the structure for reinforcing a resin molded product of the present invention, it is also preferable that, after a primer layer is provided on the resin molded product, the reinforcing sheet for a resin molded product is stuck to the resin molded product via the primer layer.

In the structure for reinforcing a resin molded product of the present invention, it is also preferable that the reinforcing sheet for a resin molded product is heated in advance to a temperature of not less than 80° C. and then stuck to the resin molded product.

A method for reinforcing a resin molded product of the present invention includes the step of stucking the foregoing reinforcing sheet for a resin molded product to a resin molded product to reinforce the resin molded product.

It is preferable that the method for reinforcing a resin molded product of the present invention further includes the step of heating the reinforcing sheet for a resin molded product and/or the resin molded product to a temperature of not less than 80° C. to bring the reinforcing sheet for a resin molded product into tight adhesive contact with the resin molded product.

It is also preferable that the method for reinforcing a resin molded product of the present invention further includes the step of providing a primer layer on the resin molded product and, in the step of sticking the reinforcing sheet for a resin molded product to the resin molded product, the reinforcing sheet for a resin molded product is stuck to the resin molded product via the primer layer.

In the method for reinforcing a resin molded product of the present invention, it is also preferable that, in the step of sticking the reinforcing sheet for a resin molded product to the resin molded product, the reinforcing sheet for a resin molded product is heated in advance to a temperature of not less than 80° C. and then stuck to the resin molded product.

According to the structure and method for reinforcing a resin molded product of the present invention using the reinforcing sheet for a resin molded product of the present invention, by sticking the reinforcing layer of the reinforcing sheet for a resin molded product to the resin molded product, it is possible to achieve tight adhesive contact between the constraining layer and the resin molded product.

Also, the reinforcing sheet for a resin molded product of the present invention that has been stuck to the polypropylene plate and heated at 80° C. for 10 minutes has a bending strength at a displacement of 1 mm at 90° C. which is as high as not less than double the bending strength of the polypropylene plate at a displacement of 1 mm at 90° C. This allows an improvement in the rigidity of the reinforcing sheet for a resin molded product in a high-temperature atmosphere. As a result, such a reinforcing sheet for a resin molded product can reliably reinforce a resin molded product.

In particular, even in an atmosphere at a temperature of a level at which the resin molded product is not melted, it is possible to maintain a light weight and excellent outer appearance, and also maintain the excellent reinforcing ability of the structure for reinforcing a resin molded product, while preventing the resin molded product from being degraded or melted.

Moreover, by sticking the reinforcing sheet for a resin molded product only to the portion of the resin molded product desired to be reinforced, only the portion can be easily reinforced.

In addition, a simple configuration including the constraining layer and the reinforcing layer allows the resin molded product to be reinforced, while achieving reductions in the thickness and weight thereof.

BRIEF DESCRIPTION OF THE DRAWINGS

FIG. 1 is an illustrative view showing an embodiment of a method for reinforcing a resin molded product of the present invention, in which a reinforcing sheet for a resin molded product of the present invention is stuck to a resin molded product to reinforce it, (a) showing the step of preparing the reinforcing sheet for a resin molded product and stripping a release film therefrom, and (b) showing the step of sticking the reinforcing sheet for a resin molded product to the resin molded product.

DETAILED DESCRIPTION OF THE INVENTION

A reinforcing sheet for a resin molded product of the present invention includes a constraining layer, and a reinforcing layer laminated on the constraining layer.

The constraining layer is provided so as to impart tenacity to the reinforcing layer after stuck and heated. The constraining layer is in the form of a sheet, lightweight and thin, and preferably formed of a material which can be brought into tight adhesive contact with the reinforcing layer to be integrated therewith. Examples of such a material include glass cloth, resin-impregnated glass cloth, nonwoven fabric, metal foil, carbon fiber, and polyester film.

The glass cloth is cloth made of glass fiber, and known glass cloth can be used.

The resin-impregnated glass cloth is the foregoing fiber cloth impregnated with a synthetic resin such as a thermosetting resin or a thermoplastic resin, and known resin-impregnated glass cloth can be used. Examples of the thermosetting resin include an epoxy resin, a urethane resin, a melamine resin, and a phenol resin. Examples of the thermoplastic resin include a vinyl acetate resin, an ethylene-vinyl acetate copolymer (EVA), a vinyl chloride resin, and an EVA-vinyl chloride resin copolymer. Each of the thermosetting resins and thermoplastic resins mentioned above may be used alone or in combination.

Examples of the nonwoven fabric include those formed of fibers such as wood fiber (wood pulp), cellulose fiber (e.g., regenerated cellulose fiber such as rayon, semisynthetic cellulose fiber such as acetate, natural cellulose fiber such as linen or cotton, or blended yarn thereof), polyester fiber, polyvinyl alcohol (PVA) fiber, polyamide fiber, polyolefin fiber, and polyurethane fiber.

Examples of the metal foil include known metal foil such as aluminum foil or steel foil.

The carbon fiber is cloth made of fiber containing carbon as a main component, and known carbon fiber can be used.

Examples of the polyester film include a polyethylene terephthalate (PET) film, a polyethylene naphthalate (PEN) film, and a polybutylene terephthalate (PBT) film. Preferably, the PET film is used.

Among these examples of the constraining layer, the resin-impregnated glass cloth is used preferably if consideration is given to adhesion, strength, and cost.

The constraining layer has a thickness in a range of, e.g., 0.05 to 2.0 mm, or preferably 0.1 to 1.0 mm.

The reinforcing layer is formed by molding an adhesive composition into a sheet shape.

The adhesive composition is thermoplastic. Specifically, the adhesive composition exhibits thermal adhesiveness (thermally pressure-sensitive adherence) by being heated to a temperature of, e.g., not less than 80° C.

The adhesive composition contains, e.g., a hydrogenated product (hydride) of a polymer of a monomer containing a conjugated diene.

Preferably, the monomer contains the conjugated diene as an essential component, and contains a copolymerizable monomer which can be copolymerized with the conjugated diene as an optional component.

Examples of the conjugated diene include 1,3-butadiene, isoprene(2-methyl-1,3-butadiene), and chloroprene (2-chloro-1,3-butadiene).

The copolymerizable monomer has at least one double bond, and examples thereof include an aliphatic vinyl monomer such as ethylene, propylene, and isobutylene(2-methylpropene); an aromatic vinyl monomer such as styrene, and a cyano group-containing vinyl monomer such as (meth)acrylonitrile.

Such a copolymerizable monomer may be used alone or in a combination of two or more kinds. Preferably, the aromatic vinyl monomer is used.

Specific examples of the polymer of a monomer include a block or random copolymer of the conjugated diene and the copolymerizable monomer and, preferably, the block copolymer is used. Specifically, a styrene-butadiene-styrene block copolymer, a styrene-isoprene-styrene block copolymer, or the like can be used.

Note that the blending ratio of the copolymerizable monomer based on 100 parts by mass of the conjugated diene is in a range of, e.g., 5 to 80 parts by mass, or preferably 15 to 50 parts by mass.

That is, the blending ratio between the copolymerizable monomer (preferably the aromatic vinyl monomer, or more preferably styrene) and the conjugated diene (preferably butadiene or isoprene) on a mass basis is in a range of, e.g., 50 mass % or less/50 mass % or more (mass ratio between the copolymerizable monomer and the conjugated diene), or preferably 40 mass % or less/60 mass % or more, and normally 10 mass % or more/90 mass % or less.

In the hydrogenated product of the polymer mentioned above, the unsaturated bond (double bond portion) derived from the conjugated diene is completely hydrogenated or partially hydrogenated, or preferably completely hydrogenated. Specific examples of the hydrogenated product include a styrene-ethylene-butylene-styrene copolymer (SEBS, or more specifically a SEBS block copolymer), and a styrene-ethylene-propylene-styrene copolymer (SEPS, or more specifically a SEPS block copolymer).

Due to the hydrogenation of the polymer described above, the hydrogenated product does not substantially contain an unsaturated bond, and is therefore less likely to be thermally degraded in a high-temperature atmosphere. This allows an improvement in the heat resistance of the reinforcing layer.

The hydrogenated product has a melt flow rate (MFR) in a range of, e.g., not more than 10 g/10 min, or preferably not more than 5 g/10 min, and normally not less than 0.1 g/10 min at a temperature of 190° C. and with a mass of 2.16 kg.

The hydrogenated product has a melt flow rate (MFR) in a range of, e.g., not more than 50 g/10 min, or preferably not more than 20 g/10 minutes, and normally not less than 0.1 g/10 min at a temperature of 200° C. and with a mass of 5 kg.

Such a hydrogenated product can be used alone or in a combination of two or more kinds.

Among these examples of the hydrogenated product, SEBS is used preferably.

Preferably, the adhesive composition is caused to also contain polyolefin.

Polyolefin is blended in the adhesive compound to improve the reinforcing ability of the reinforcing layer in a high-temperature atmosphere (at a high temperature of a level at which the resin molded product is not melted, specifically in the range of 60 to 90° C.).

Examples of polyolefin include a homopolymer such as polyethylene or polypropylene, and a copolymer such as an ethylene-propylene copolymer. A polyolefin can be used alone or a plurality of polyolefins can be used in combination.

As polyolefin, a homopolymer can be used preferably.

Polyolefin has a melt flow rate (MFR) measured according to JIS K 7210 (1999) or JIS K 6922-2 (2010) which is in a range of, e.g., 0.1 to 100 g/10 min, or preferably 0.5 to 25 g/10 min.

Also, polyolefin has a melting point measured by a DSC method according to ISO11357-3, which is in excess of 90° C., or preferably in the range of 100 to 120° C.

Also, polyolefin has a Vicat softening temperature measured according to JIS K 7206 (1999) which is in a range of, e.g., 70 to 100° C., or preferably 80 to 100° C.

Also, polyolefin has a brittle temperature measured according to ISO 974 which is in a range of, e.g., less than −25° C., or preferably less than −50° C., and also, e.g., not less than −100° C.

Also, polyolefin has a tensile stress at break measured according to JIS K 6922-2 (2010) which is in a range of, e.g., 1 to 50 MPa, or preferably 5 to 20 MPa.

Also, polyolefin has a tensile yield stress measured according to JIS K 7161 (1994) or JIS K 7162 (1994) which is in a range of, e.g., 10 to 50 MPa, or preferably 20 to 40 MPa.

Polyolefin has a nominal tensile strain at break measured according to JIS K 6922-2 (2010) which is in a range of, e.g., 50 to 150%, or preferably 70 to 130%, and a nominal tensile strain at break measured according to JIS K 7161 (1994) or JIS K 7162 (1994) which is in a range of, e.g., 10 to 1000%, or preferably 25 to 500%.

Also, polyolefin has a flexural modulus measured according to JIS K 6922-2 (2010) which is in a range of, e.g., 80 to 250 MPa, or preferably 100 to 225 MPa, and a flexural modulus measured according to JIS K 7171 (2008) which is in a range of, e.g., 500 to 5000 MPa, or preferably 800 to 2000 MPa.

Polyolefin has a Charpy impact strength measured according to JIS K 7111 (2006) which is in a range of, e.g., 1 to 100 kJ/m$^2$, or preferably 2 to 80 kJ/m$^2$.

Polyolefin has a durometer hardness measured according to JIS K 7215 (1986) which is in a range of, e.g., 10 to 100 HDD, or preferably 30 to 70 HDD.

Also, polyolefin has a Rockwell hardness measured according to JIS K 7202 (2001) which is in a range of, e.g., 10 to 500 HRR, or preferably 25 to 200 HRR.

The blending ratio of polyolefin based on 100 parts by mass of the hydrogenated product is in a range of, e.g., 10 to 200 parts by mass, preferably 15 to 180 parts by mass, more preferably 30 to 170 parts by mass, particularly preferably 50 to 160 parts by mass, or most preferably 80 to 150 parts by mass.

When the blending ratio of polyolefin exceeds the foregoing ranges, the adherence to the resin molded product may be degraded.

On the other hand, when the blending ratio of polyolefin is less than the foregoing ranges, it may be impossible to sufficiently improve the reinforcing ability in an atmosphere at a high temperature of a level at which the resin molded product is not melted.

Preferably, the adhesive composition is caused to also contain a tackifier.

The tackifier is contained in the adhesive composition so as to improve the adhesion between the reinforcing layer and each of the resin molded product and the constraining layer or improve a reinforcing property when the resin molded product is reinforced.

Examples of the tackifier include a rosin resin, a terpene resin (including a terpene-phenol copolymer and a hydrogenated terpene resin), a coumarone-indene resin, an alicyclic saturated hydrocarbon resin (containing a completely hydrogenated product or a partially hydrogenated product), and a petroleum resin (e.g., a hydrocarbon petroleum resin such as an aliphatic/aromatic copolymer petroleum resin or an aromatic petroleum resin).

The tackifier has a softening point in a range of, e.g., 50 to 150° C., or preferably 50 to 130° C.

Note that the softening point of the tackifier is measured by a ring and ball method.

Such a tackifier may be used alone or in a combination of two or more kinds.

Among these tackifiers, the alicyclic saturated hydrocarbon resin is used preferably in terms of compatibility with the hydrogenated product.

The blending ratio of the tackifier based on 100 parts by mass of the hydrogenated product is in a range of, e.g., 40 to 200 parts by mass, or preferably 50 to 170 parts by mass.

When the blending ratio of the tackifier is less than the foregoing ranges, it may be impossible to sufficiently improve the adhesion between the reinforcing layer and each of the resin molded product and the constraining layer or sufficiently improve the reinforcing property when the resin molded resin is reinforced.

On the other hand, when the blending ratio of the tackifier exceeds the foregoing ranges, the reinforcing layer may be brittle.

To the adhesive composition, in addition to the foregoing components, additives such as a filler, an oxidation inhibitor, a softener (such as, e.g., naphthene oil or paraffin oil), a thixotropic agent (such as, e.g., montmorillonite), a lubricant (such as, e.g., a stearic acid), a pigment, an antiscorch agent, a stabilizer, an antioxidant, an ultraviolet absorber, an antifungal agent, and a fire retardant may be added at an appropriate ratio.

The filler includes a colorant. Examples of the filler include magnesium oxide, calcium carbonate (such as, e.g., heavy calcium carbonate, light calcium carbonate, or Hakuenka®), magnesium silicate (such as, e.g., talc), mica, clay, mica powder, bentonite (such as, e.g., organic bentonite), silica, alumina, aluminum hydroxide, aluminum silicate, titanium oxide, carbon black (such as, e.g., insulating carbon black or acetylene black), aluminum powder, and glass balloon. These fillers may be used alone or in a combination of two or more kinds.

As the filler, calcium carbonate or carbon black is used preferably.

Examples of the oxidation inhibitor include an amineketone compound, an aromatic secondary amine compound, a phenol compound (such as, e.g., pentaerythritol tetrakis[3-(3,5-di-tert-butyl-4-hydroxyphenyl)propionate]), a benzimidazole compound (such as, e.g., 2-mercaptobenzimidazole), a thiourea compound, and a phosphite compound. These oxidation inhibitors can be used alone or in a combination of two or more kinds. Preferably, the phenol compound or benzimidazole compound can be used.

The ratio of the additive to be added based on 100 parts by mass of the hydrogenated product is particularly in a range of, e.g., 1 to 200 parts by mass when the additive is the filler and, e.g., 0.1 to 5 parts by mass when the additive is the oxidation inhibitor.

The adhesive composition can be prepared by blending the individual components described above at the blending ratio described above. To further form the reinforcing layer and laminate the reinforcing layer on the constraining layer, a direct formation method can be used in which the individual components described above are dissolved or dispersed at the foregoing blending ratio in a known solvent (e.g., an organic solvent such as toluene) to prepare a solution or dispersion liquid, and then the obtained solution or dispersion liquid is coated on the surface of the constraining layer and then dried.

Alternatively, a transfer method can also be used in which the obtained solution or dispersion liquid is coated on the surface of a release film described later and then dried to form the reinforcing layer, and then the reinforcing layer is transferred to the surface of the constraining layer.

To prepare the adhesive composition to form the reinforcing layer and laminate the reinforcing layer on the constraining layer, another direct formation method can also be used in which the individual components described above (except for the solvent described above and water) are directly kneaded using, e.g., a mixing roll, a pressure kneader, an extruder, or the like to prepare a kneaded material, which is then molded into a sheet shape by, e.g., calendering, extrusion molding, press molding, or the like to form the reinforcing layer, which is then laminated on the surface of the constraining layer. Specifically, the kneaded material is disposed between the constraining layer and the release film (described layer) to be sandwiched therebetween, which are then extended by, e.g., press molding into a sheet shape. Alternatively, another transfer method can also be used in which the formed reinforcing layer is laminated on the surface of the release film and then transferred to the surface of the constraining layer.

The reinforcing layer thus formed has a thickness in a range of, e.g., 0.02 to 3.0 mm, or preferably 0.03 to 1.3 mm.

The reinforcing sheet for resin molded product thus obtained has a thickness in a range of, e.g., 0.25 to 5.0 mm, or preferably 0.4 to 2.3 mm.

When the thickness of the reinforcing sheet for resin molded product exceeds the ranges described above, it may be difficult to achieve a reduction in the weight of the reinforcing sheet for resin molded product or the manufacturing cost thereof may be increased. When the thickness of the reinforcing sheet for resin molded product is less the foregoing ranges, it may be impossible to sufficiently improve the reinforcing property.

Note that, in the obtained reinforcing sheet for resin molded product, the release film (separator) stuck to the top surface of the reinforcing layer (surface thereof opposite to the back surface thereof on which the constraining layer is adhesively laminated) can also be left as necessary for a period until the reinforcing sheet for resin molded product is actually used.

Examples of the release film include known release films such as synthetic resin films such as a polyethylene film, a polypropylene film, and a PET film.

After the reinforcing sheet for resin molded product (the reinforcing layer thereof) thus formed is stuck to a polypropylene plate having a thickness of 2.0 mm and heated at 80° C. for 10 minutes, the reinforcing sheet for resin molded product has a bending strength at a displacement of 1 mm at 90° C. (measurement temperature) which is not less than double the bending strength of the polypropylene plate having a thickness of 2.0 mm at a displacement of 1 mm at 90° C. (measurement temperature).

That is, the ratio (bending strength ratio) of the bending strength of the polypropylene plate reinforced by the reinforcing sheet for resin molded product and heated at 80° C. for 10 minutes at a displacement of 1 mm at 90° C. to the bending strength of the polypropylene plate not reinforced by the reinforcing sheet for resin molded product at a displacement of 1 mm at 90° C. is not less than 2.

To measure the bending strength of the reinforcing sheet for resin molded product adhesively bonded to the polypropylene plate at a displacement of 1 mm at 90° C., the reinforcing layer is first brought into contact with the polypropylene plate having a thickness of 2.0 mm to sticking the reinforcing sheet for resin molded product to the polypropylene plate, which are then put into a drier set at 80° C. (temperature for achieving tight adhesive contact) for 10 minutes and brought into tight adhesive contact with each other to provide a laminate plate.

Thereafter, the laminate plate retrieved from the drier is trimmed into a piece measuring 150 mm long and 25 mm wide to obtain a test specimen.

Thereafter, in a universal testing machine provided with a thermostatic bath set at 90° C. (measurement temperature), the test specimen is placed in the thermostatic bath, and the bending strength of the test specimen at a displacement of 1 mm at 90° C. is measured by a three point bending test in which the distance between supporting points is set to 100 mm and the center (lengthwise center and widthwise center) of the test specimen is pressed from the polypropylene plate side with an indenter having a diameter of 10 mm at a speed of 50 mm/min.

The measured bending strength is defined to be the bending strength of the reinforcing sheet for resin molded product adhesively bonded to the polypropylene plate at a displacement of 1 mm at 90° C.

In the description given above, the bending strength is calculated on the condition that the measurement temperature is 90° C. and the displacement is 1 mm but, even at a measurement temperature (other than 90° C.) and a displacement (other than 1 mm) each described later, the bending strength is calculated by performing the same processing.

On the other hand, to measure the bending strength of the propylene plate at a displacement of 1 mm at 90° C., a polypropylene plate having a thickness of 2.0 mm and not reinforced by the reinforcing sheet for resin molded product (to which the reinforcing sheet for resin molded product is not adhesively bonded) is trimmed into a piece measuring 150 mm long and 25 mm wide to obtain a test specimen.

Thereafter, in a universal testing machine provided with a thermostatic bath set at 90° C. (measurement temperature), the test specimen is placed in the thermostatic bath, and a three point bending test is performed in which the distance between supporting points is set to 100 mm and the center (lengthwise center and widthwise center) of the test specimen is pressed with an indenter having a diameter of 10 mm at a speed of 50 mm/min.

In this manner, the bending strength of the propylene plate at a displacement of 1 mm at 90° C. is obtained as the reference value of the bending strength ratio.

Note that the foregoing bending strength at a displacement of 1 mm is measured as a bending strength (strength) at the time when the indenter is displaced by 1 mm after the initiation of pressing.

If the bending strength ratio at a displacement of 1 mm is within the foregoing range, in an atmosphere at a high temperature of a level at which the resin molded product is not melted, the resin molded product can be sufficiently reinforced.

The bending strength ratio at a displacement of 1 mm at 90° C. is preferably not less than 3, or more preferably not less than 4, and also, e.g., not more than 10.

Specifically, after being heated at 80° C. for 10 minutes, the polypropylene plate reinforced by the reinforcing sheet for resin molded product has a bending strength at a displacement of 1 mm at 90° C. which is in a range of, e.g., 0.8 to 4.5 N, preferably 1.0 to 4.0 N, or more preferably 1.4 to 3.0 N.

Note that the bending strength of the polypropylene plate at a displacement of 1 mm at 90° C. is in a range of, e.g., 0.3 to 0.6 N, and also in a range of 0.4 to 0.5 N.

After the reinforcing layer thereof being stuck to a polypropylene plate having a thickness of 2.0 mm and heated at 80° C. for 10 minutes, the reinforcing sheet for resin molded product has a bending strength at a displacement of 2 mm at 90° C. which is, e.g., 2 to 10 times, or preferably 2.5 to 5 times the bending strength of the polypropylene plate having a thickness of 2.0 mm at a displacement of 2 mm at 90° C.

Specifically, after being heated at 80° C. for 10 minutes, the polypropylene plate reinforced by the reinforcing sheet for resin molded product has a bending strength at a displacement of 2 mm at 90° C. which is in a range of, e.g., 1.6 to 8.0 N, or preferably 1.8 to 4.0 N.

Note that the bending strength of the polypropylene plate at a displacement of 2 mm at 90° C. is in a range of, e.g., 0.5 to 1.0 N, and also in a range of 0.6 to 0.9 N.

After the reinforcing layer thereof being stuck to a polypropylene plate having a thickness of 2.0 mm and heated at 80° C. for 10 minutes, the reinforcing sheet for resin molded product has a bending strength at a maximum displacement at 90° C. which is, e.g., 2 to 10 times, or preferably 2.5 to 5 times the bending strength of the polypropylene plate having a thickness of 2.0 mm at a maximum displacement at 90° C.

Specifically, after being heated at 80° C. for 10 minutes, the polypropylene plate reinforced by the reinforcing sheet for resin molded product has a bending strength at the maximum displacement at 90° C. which is in a range of, e.g., 7.2 to 36 N, or preferably 9.0 to 18.0 N.

Note that the bending strength of the polypropylene plate at the maximum displacement at 90° C. is in a range of, e.g., 3.0 to 4.0 N, and also in a range of, e.g., 3.2 to 3.8 N.

Note that a maximum bending strength is obtained as a maximum bending strength (strength) between the time of initiation of pressing and the time of fracture of the test specimen.

After the reinforcing layer thereof being stuck to a polypropylene plate having a thickness of 2.0 mm and heated at 80° C. for 10 minutes, the reinforcing sheet for resin molded product has a bending strength at a displacement of 1 mm at 60 to 90° C. which is, e.g., not less than 3 times, preferably not less than 3.2 times, or more preferably not less than 3.5 times, and also not more than, e.g., 10 times the bending strength of the polypropylene plate having a thickness of 2.0 mm at a displacement of 1 mm at 60 to 90° C.

That is, the ratio (bending strength ratio) of the bending strength of the polypropylene plate reinforced by the reinforcing sheet for resin molded product and heated at 80° C. for 10 minutes at a displacement of 1 mm at 60 to 90° C. to the bending strength of the polypropylene plate not reinforced by the reinforcing sheet for resin molded product at a displacement of 1 mm at 60 to 90° C. is, e.g., not less than 3, preferably not less than 3.2, or more preferably not less than 3.5, and also, e.g., not more than 10.

If the bending strength ratio at a displacement of 1 mm at 60 to 90° C. is within the foregoing ranges, the resin molded product can be sufficiently reinforced in an extensive atmosphere at a high temperature of a level at which the resin molded product is not melted.

Specifically, the bending strength ratio at a displacement of 1 mm at 60° C. is, e.g., not less than 3.0, preferably not less than 3.5, or more preferably not less than 4.0, and also, e.g., not more than 10. The bending strength ratio at a displacement of 1 mm at 70° C. is, e.g., not less than 3.0, preferably not less than 3.5, or more preferably not less than 4.0, and also, e.g., not more than 10. The bending strength ratio at a displacement of 1 mm at 80° C. is, e.g., not less than 2.0, preferably not less than 3.0, more preferably not less than 3.5, or particularly preferably not less than 4.0, and also, e.g., not more than 10.

Specifically, after being heated at 80° C. for 10 minutes, the polypropylene plate reinforced by the reinforcing sheet for resin molded product has a bending strength at a displacement of 1 mm at 60° C. which is in a range of, e.g., 2.3 to 7.5 N, preferably 2.6 to 7.0 N, or more preferably 2.9 to 6.0 N. On the other hand, the bending strength of the polypropylene plate at a displacement of 1 mm at 60° C. is in a range of, e.g., 0.7 to 0.8 N.

Also, after being heated at 80° C. for 10 minutes, the polypropylene plate reinforced by the reinforcing sheet for resin molded product has a bending strength at a displacement of 1 mm at 70° C. which is in a range of, e.g., 1.8 to 6.0 N, preferably 2.0 to 5.0 N, or more preferably 2.2 to 4.5 N. On the other hand, the bending strength of the polypropylene plate at a displacement of 1 mm at 70° C. is in a range of, e.g., 0.55 to 0.65 N.

Also, after being heated at 80° C. for 10 minutes, the polypropylene plate reinforced by the reinforcing sheet for resin molded product has a bending strength at a displacement of 1 mm at 80° C. which is in a range of, e.g., 1.4 to 5.0 N, preferably 1.7 to 4.5 N, or more preferably 1.9 to 4.0 N. On the other hand, the bending strength of the polypropylene plate at a displacement of 1 mm at 80° C. is in a range of, e.g., 0.45 to 0.50 N.

After the reinforcing layer thereof being stuck to a polypropylene plate having a thickness of 2.0 mm and heated at 80° C. for 10 minutes, the reinforcing sheet for resin molded product has a bending strength at a displacement of 1 mm at a room temperature (25° C.) which is, e.g., not less than 3.0 times, preferably not less than 3.5 times, or more preferably not less than 4.0 times, and also, e.g., not more than 10 times the bending strength of the polypropylene plate having a thickness of 2.0 mm at a displacement of 1 mm at a room temperature (25° C.).

Specifically, after being heated at 80° C. for 10 minutes, the polypropylene plate reinforced by the reinforcing sheet for resin molded product has a bending strength at a displacement of 1 mm at a room temperature (25° C.) which is in a range of, e.g., 4.8 to 16 N, preferably 5.6 to 12 N, or more preferably 6.4 to 10 N.

Note that the bending strength of the polypropylene plate at a displacement of 1 mm at a room temperature (25° C.) is in a range of, e.g., 1.5 to 1.8 N.

After the reinforcing layer is stuck to the polypropylene plate at a room temperature (25° C.), the reinforcing sheet for resin molded product has an adhesive force (initial adhesive force) to the propylene plate which is measured by a 90° peel test at a peeling speed of 300 mm/min to be, e.g., not less than 3.0 N/25 mm, preferably not less than 3.5 N/25 mm, or more preferably not less than 4.0 N/25 mm, and also, e.g., not more than 20N/25 mm.

The adhesive force mentioned above is measured according to JIS Z0237 (2009).

If the initial adhesive force of the reinforcing sheet for resin molded product is within the ranges shown above, the reinforcing layer shows slight adherence (a weak tack property). Therefore, at a room temperature, the reinforcing sheet for resin molded product can be reliably stuck to the resin molded product without being heated.

On the other hand, after the reinforcing layer is stuck to the polypropylene plate at a room temperature and heated at 80° C. for 10 minutes, the reinforcing sheet for resin molded product has an adhesive force (post-heating adhesive force) to the propylene plate which is measured by a 90° peel test at a peeling speed of 300 mm/min to be, e.g., not less than 10.0 N/25 mm, preferably not less than 11.0 N/25 mm, or more preferably not less than 12.0 N/25 mm, and also, e.g., not more than 80N/25 mm.

If the post-heating adhesive force of the reinforcing sheet for resin molded product is within the ranges shown above, the reinforcing layer shows adherence through heating. Therefore, the reinforcing sheet for resin molded product can be reliably adhesively bonded to the resin molded product.

The adherence described above is measured according to JIS Z0237 (2009).

Note that each of the adhesive forces of the reinforcing sheet for resin molded product is substantially the same as the adhesive force of the corresponding reinforcing layer.

The reinforcing sheet for resin molded product of the present invention is used to reinforce a resin molded product.

The resin molded product is not particularly limited as long as the resin molded product needs reinforcement. For example, a resin molded product used for various industrial products can be used. Examples of a resin for forming the resin molded product include a low-polarity resin such as polyolefin.

Examples of polyolefin include polypropylene and polyethylene. Preferably, polypropylene can be used.

Specific examples of such a resin molded product include the bumper of an automobile and the instrument panel thereof.

FIG. 1 is an illustrative view showing an embodiment of a method for reinforcing a resin molded product of the present invention, in which a reinforcing sheet for a resin molded product of the present invention is stuck to a resin molded product to reinforce it, (a) showing the step of preparing the reinforcing sheet for a resin molded product and stripping a release film therefrom, and (b) showing the step of sticking the reinforcing sheet for a resin molded product to the resin molded product.

Next, referring to FIG. 1, a description is given to an embodiment of a structure and method for reinforcing a resin molded product of the present invention in which the reinforcing sheet for resin molded product of the present invention is stuck to the resin molded product to reinforce it.

As shown in FIG. 1(a), in a reinforcing sheet for resin molded product 1, a reinforcing layer 2 is laminated on a constraining layer 3, and a release film 6 is stuck as necessary to the top surface of the reinforcing layer 2 (surface thereof opposite to the back surface thereof on which the constraining layer 3 is laminated).

As shown in FIG. 1(b), the resin molded product 4 is to be used in the various industrial products described above, and is formed in a plate shape. More specifically, the resin molded product 4 is formed to include an outer surface 7 which is recognizable in an outer appearance and an inner surface 8 which is not recognizable in an outer appearance.

To stick the reinforcing sheet for resin molded product 1 to the resin molded product 4, as shown by the phantom line in FIG. 1(a), the release film 6 is stripped first from the surface of the reinforcing layer 2. Then, as shown in FIG. 1 (b), the surface of the reinforcing layer 2 is brought into contact with the inner surface 8 of the resin molded product 4, and pressure-bonded thereto as necessary. In the pressure bonding of the reinforcing sheet for resin molded product 1, pressing is performed under a pressure in a range of, e.g., about 0.15 to 10 MPa.

Further, as necessary, heating (thermocompression) can also be performed simultaneously with pressing. That is, the reinforcing sheet for resin molded product 1 is heated in advance, and then the heated reinforcing sheet for resin molded product 1 is stuck to the resin molded product 4.

Conditions for the thermocompression includes a temperature which is in a range of, e.g., not less than 80 C.°, preferably not less than 90 C.°, or more preferably not less than 100 C.°, and normally not more than the heat resistance temperature of the resin molded product 4. Specifically, the temperature is in a range of, e.g., not more than 130 C.°, preferably 30 to 120 C.°, or more preferably 80 to 110 C.°.

Thereafter, the resin molded product 4 to which the reinforcing sheet for resin molded product 1 is stuck is preferably heated.

The heating temperature is in a range of, e.g., not less than 80 C.°, preferably not less than 90 C.°, or more preferably not less than 100 C.°, and normally not more than the heat resistance temperature of the resin molded product 4. Specifically, the temperature is in a range of, e.g., not more than 130 C.°, preferably 30 to 120 C.°, or more preferably 80 to 110 C.°. The heating time is in a range of, e.g., 0.5 to 20 minutes, or preferably 1 to 10 minutes.

When the heating temperature and the heating time are less than the ranges shown above, it may be impossible to achieve sufficiently tight adhesive contact between the resin molded product 4 and the constraining layer 3 or sufficiently improve the reinforcing property when the resin molded product 4 is reinforced. When the heating temperature and the heating time exceed the ranges shown above, the resin molded product 4 may be degraded or melted.

The heating of the resin molded product 4 described above is performed by putting the resin molded product 4 to which the reinforcing sheet for resin molded product 1 is stuck into a drying oven in the drying step of the manufacturing of the resin molded product 4.

Alternatively, when the manufacturing of the resin molded product 4 does not include the drying step, a partially heating device such as a heat gun is used instead of putting the resin molded product 4 into the drying oven described above to heat only the reinforcing sheet for resin molded product 1.

Otherwise, it is also possible to use the heating device described above and heat only the resin molded product 4 or each of the reinforcing sheet for resin molded product 1 and the resin molded product 4. Note that, when only the resin molded product 4 is heated, heat from the heating device is transferred (thermally conducted) to the reinforcing sheet for resin molded product 1 via the resin molded product 4.

Then, the reinforcing sheet for resin molded product 1 is stuck to the resin molded product 4. Thereafter, the reinforcing sheet for resin molded product 1 and/or the resin molded product 4 is further heated as necessary such that the reinforcing sheet for resin molded product 1 is brought into tight adhesive contact with the resin molded product 4. In this manner, the structure for reinforcing the resin molded product 4 is formed in which the resin molded product 4 is reinforced by the reinforcing sheet for resin molded product 1.

According to the structure and method for reinforcing the resin molded product 4, by adhesively bonding the reinforcing layer 2 of the reinforcing sheet for resin molded product 1 to the resin molded product 4, the constraining layer 3 and the resin molded product 4 can be brought into tight adhesive contact with each other.

In addition, since the polypropylene plate to which the reinforcing sheet for resin molded product 1 is stuck and which has been heated at 80° C. for 10 minutes has a bending strength at a displacement of 1 mm at 90° C. which is as high as not less than double the bending strength of the polypropylene plate at a displacement of 1 mm at 90° C., the rigidity of the reinforcing sheet for resin molded product 1 in a high-temperature atmosphere can be improved. As a result, it is possible to reliably reinforce the resin molded product 4 using the reinforcing sheet for resin molded product 1.

In particular, even in an atmosphere at a high temperature of a level at which the resin molded product 4 is not melted, it is possible to maintain a light weight and excellent outer appearance, and also maintain the excellent reinforcing ability of the structure for reinforcing the resin molded product 4, while preventing the resin molded product 4 from being degraded or melted.

In other words, it is possible to maintain a light weight and excellent outer appearance in an atmosphere at a high temperature (specifically in the range of 60 to 90° C.) in which the resin molded product 4 is not melted, but is prone to thermal deformation, and maintain the excellent reinforcing ability of the structure for maintaining the resin molded product 4, while preventing the resin molded product 4 from being degraded or melted.

Moreover, by sticking the reinforcing sheet for resin molded product 1 only to the portion of the resin molded product 4 desired to be reinforced, only the portion can be easily reinforced.

In addition, a simple configuration including the constraining layer 3 and the reinforcing layer 2 allows the resin molded product 4 to be reinforced while achieving reductions in the thickness and weight thereof.

Note that, in the embodiment of FIG. 1(*b*), the reinforcing layer 2 is directly adhesively bonded to the inner surface 8 of the resin molded product 4 but, as shown by the dot-dash line in FIG. 1(*b*), a primer layer 9 can also be interposed therebetween.

That is, as shown by the dot-dash line in FIG. 1(*b*), the primer layer 9 is formed on the inner surface 8 of the resin molded product 4.

The primer layer 9 is prepared from, e.g., modified polypropylene.

The primer layer 9 has a thickness in a range of, e.g., 1 to 20 nm, or preferably 2 to 10 μm.

The primer layer 9 is formed on the inner surface 8 of the resin molded product 4 by coating, e.g., a solution (varnish) in which modulated polypropylene is dissolved in a solvent.

To reinforce the resin molded product 4 using the primer layer 9 and the reinforcing sheet for resin molded product 1, the resin molded product 4 is prepared first, and then the primer layer 9 is formed on the inner surface 8 of the resin molded product 4.

Thereafter, the reinforcing sheet for resin molded product 1 is stuck to the resin molded product 4 via the primer layer 9. Specifically, the reinforcing sheet for resin molded product 1 is brought into contact with the primer layer 9. As necessary, under the same conditions as shown above, pressure bonding or thermocompression is performed.

Thereafter, the resin molded product 4 to which the reinforcing sheet for resin molded product 1 is stuck is heated.

Then, in the structure for reinforcing the resin molded product 4 reinforced by the reinforcing sheet for resin molded product 1, the primer layer 9 improves the adhesion (adhesive force) between the reinforcing layer 2 and the resin molded product 4.

Specifically, the primer layer made of modified propylene (RC-1028 available from LORD Far East Inc.) and having a thickness of 10 μm is provided on the polypropylene plate, and then the reinforcing layer is stuck to the polypropylene plate via the primer layer at a room temperature (25° C.). Then, the adhesive force (initial adhesive force) of the reinforcing sheet for resin molded product to the polypropylene plate is measured by a 90° peel test at a peeling speed of 300 mm/min to be, e.g., not less than 20.0 N/25 mm, preferably not less than 30N/25 mm, or more preferably not less than 40 N/25 mm, and also, e.g., not more than 200 N/25 mm.

Also, the primer layer made of modified propylene and having a thickness of 10 μm is provided on the polypropylene plate, and then the reinforcing layer is stuck to the polypropylene plate via the primer layer at a room temperature. Then, after heating at 80° C. for 10 minutes, the adhesive force (post-heating adhesive force) of the reinforcing sheet for resin molded product to the polypropylene plate is measured by a 90° peel test at a peeling speed of 300 mm/min to be, e.g., not less than 10.0 N/25 mm, preferably not less than 30N/25 mm, or more preferably not less than 40 N/25 mm, and also, e.g., not more than 200 N/25 mm.

In the embodiment of FIG. 1, the reinforcing layer 2 is formed only of one sheet made of an adhesive composition. However, as shown by, e.g., the broken line in FIG. 1, nonwoven fabric 5 may also be allowed to intervene in the reinforcing layer 2 at a middle point in the thickness direction thereof.

As the nonwoven fabric 5, the same nonwoven fabric as shown above can be used. The nonwoven fabric 5 has a thickness in a range of, e.g., 0.01 to 0.3 mm.

To manufacture the reinforcing sheet for resin molded product 1 in accordance with, e.g., a direct formation method, a first reinforcing layer is laminated on the constraining layer 3, the nonwoven fabric 5 is laminated on the top surface of the first reinforcing layer (surface thereof opposite to the back surface thereof on which the constraining layer 3 is laminated), and then a second reinforcing layer is laminated on the top surface of the nonwoven fabric 5 (surface thereof opposite to the back surface thereof on which the first reinforcing layer is laminated).

In accordance with a transfer method, the nonwoven fabric 5 is sandwiched between the first reinforcing layer and the second reinforcing layer from the both top surface and back surface sides of the nonwoven fabric 5. Specifically, the first reinforcing layer and the second reinforcing layer are formed first on the respective surfaces of two release films 6, then the first reinforcing layer is transferred to the back surface of the nonwoven fabric 5, while the second reinforcing layer is transferred to the top surface of the nonwoven fabric 5.

By interposing the nonwoven fabric 5, the reinforcing layer 2 can be easily formed thick in accordance with the strength of the resin molded product 4 to be reinforced.

EXAMPLES

While in the following, the present invention is described more specifically with reference to Examples, Comparative Example, and Reference Example, the present invention is by no means limited thereto.

Examples 1-11 and Comparative Example 1

In accordance with the blending formulation shown in Table 1, the individual components were blended on a part by mass basis, and kneaded with a mixing roll heated in advance to 120° C. to prepare a kneaded material of a thermoplastic adhesive composition.

Then, the prepared kneaded material of the adhesive composition was sandwiched between resin-impregnated glass cloth (constraining layer) impregnated with an epoxy resin and having a thickness of 0.18 mm and a release film, and extended into a sheet shape by press molding at 120° C. to produce a reinforcing sheet for resin molded product having a thickness of 0.8 mm (see FIG. 1(a)). Note that the thickness of a reinforcing layer was 0.62 mm

TABLE 1

| | | | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Comp. Ex. 1 |
|---|---|---|---|---|---|---|---|---|---|---|---|---|---|---|---|
| Adhesive Composition (Reinforcing Layer) | Hydrogenated Product of Polymer | SEBS | H1052X | 100 | 100 | 100 | 100 | 100 | 100 | 100 | 100 | 100 | 100 | 100 | 100 |
| | Polyolefin | PE | Novatec LD LF440C | 100 | — | — | — | — | — | — | — | — | — | — | — |
| | | | Petrothene 208 | — | 100 | — | — | — | — | — | — | — | — | — | — |
| | | | Sumikathene F213P | — | — | 100 | — | — | — | — | — | — | — | — | — |
| | | | Novatec LD LC720 | — | — | — | 100 | — | — | — | — | — | — | — | — |
| | | | Petrothene 202 | — | — | — | — | 100 | — | — | — | — | — | — | — |
| | | PP | Wintec WEG7T | — | — | — | — | — | 20 | 40 | 60 | — | — | — | — |
| | | | Sun-Allomer PC480A | — | — | — | — | — | — | — | — | 20 | 40 | 60 | — |
| | SBS | | T432 | — | — | — | — | — | — | — | — | — | — | — | 50 |
| | | | A | — | — | — | — | — | — | — | — | — | — | — | 50 |
| Tackifier | Alicyclic Saturated Hydrocarbon Resin | | Arkon P100 | 70 | 70 | 70 | 70 | 70 | 70 | 70 | 70 | 70 | 70 | 70 | 70 |
| | | | Arkon M100 | 30 | 30 | 30 | 30 | 30 | 30 | 30 | 30 | 30 | 30 | 30 | 30 |
| | Aliphatic/ Aromatic Copolymer Petroleum Resin | | Petrotack 90HM | — | — | — | — | — | — | — | — | — | — | — | 100 |
| Filler | | | Heavy Calcium Carbonate | 100 | 100 | 100 | 100 | 100 | 100 | 100 | 100 | 100 | 100 | 100 | 100 |
| | | | Asahi Carbon #50 | 1 | 1 | 1 | 1 | 1 | 1 | 1 | 1 | 1 | 1 | 1 | 1 |
| Oxidation Inhibitor | | | Irganox 1010 | 2 | 2 | 2 | 2 | 2 | 2 | 2 | 2 | 2 | 2 | 2 | 2 |
| | | | Nocrac MB | 1 | 1 | 1 | 1 | 1 | 1 | 1 | 1 | 1 | 1 | 1 | 1 |

Note that the values of the individual components of the adhesive composition (reinforcing layer) in Table 1 show the numbers of parts of the blended components.

The details of the individual components shown in Table 1 are shown below.

H1052X is a styrene-ethylene-butylene-styrene block copolymer available under the trade name of "Tuftec H1052" from Asahi Kasei Chemicals Corporation and having a styrene/ethylene-butadiene ratio of 20 mass %/80 mass %, an MFR (190° C., 2.16 kg)) of 3 g/10 min, and an MFR (200° C., 5 kg)) of 10 g/10 min.

Heavy calcium carbonate is available from Maruo Calcium, Co., Ltd.

Asahi Carbon #50 (trade name) is carbon black available from Asahi Carbon Co., Ltd.

Irganox 1010 (trade name) is pentaerythritol tetrakis[3-(3,5-di-tert-butyl-4-hydroxyphenyl)propionate] available from BASF Ltd.

Nocrac MB (trade name) is 2-mercaptobenzimidazole available from Ouchi Shinko Chemical Industrial Co., Ltd.

Further details of polypropylene and polyethylene are shown respectively in Tables 2 and 3.

TABLE 2

| Physical Property | Unit | Measurement Standard | Polyethylene | | | | |
|---|---|---|---|---|---|---|---|
| | | | Novatec LD LF440C | Petrothene 208 | Sumikathene F213P | Novatec LD LC720 | Petrothene 202 |
| MFR | g/10 min | JIS K 6922-2 (2010) | 2.8 | 23 | 1.5 | 9.4 | 24 |
| Tensile Stress at Break | MPa | JIS K 6922-2 (2010) | 12 | 9 | 12 | 11 | 9 |
| Nominal Tensile Strain at Break | % | JIS K 6922-2 (2010) | — | — | 100 | — | — |
| Tensile Strain at Break | % | JIS K 6922-2 (2010) | 100 | 110 | — | 100 | 100 |
| Flexural Modulus | MPa | JIS K 6922-2 (2010) | 190 | 160 | 215 | 160 | 120 |
| Charpy Impact Strength | kJ/m$^2$ | JIS K 6922-2 (2010) | — | — | — | No Breakage | — |
| Durometer Hardness | HDD | JIS K 7215 (1986) | 52 | 58 | 51 | 50 | 53 |
| Vicat Softening Temperature | ° C. | JIS K 7206 (1999) | 98 | 91 | 95 | 86 | 82 |
| Melting Point (DSC Method) | ° C. | ISO 11357-3 | 113 | 111 | 112 | 106 | 106 |
| Brittle Temperature | ° C. | ISO 974 | <−70 | −60 | <−65 | <−70 | −60 |

Novatec-LD LF440C (trade name) is polyethylene available from Japan Polypropylene Corporation and having the physical properties shown in Table 2.

Petrothene 208 (trade name) is polyethylene available from Tosoh Corporation and having the physical properties shown in Table 2.

Sumikathene F213P (trade name) is polyethylene available from Sumitomo Chemical Co., Ltd. and having the physical properties shown in Table 2.

Novatec-LD LC720 (trade name) is polyethylene available from Japan Polypropylene Corporation and having the physical properties shown in Table 2.

Petrothene 202 (trade name) is polyethylene available from Tosoh Corporation and having the physical properties shown in Table 2.

Wintec WEG7T (trade name) is polypropylene available from Japan Polypropylene Corporation and having the physical properties shown in Table 3.

Sun-Allomer PC480A (trade name) is polypropylene available from Sun-Allomer Ltd. and having the physical properties shown in Table 3.

T432 is a styrene-butadiene copolymer available under the trade name of "Asaprene T432" from Asahi Kasei Chemicals Corporation and having a styrene/butadiene ratio of 30 mass %/70 mass %.

A is a styrene-butadiene copolymer available under the trade name of "Tufprene A" from Asahi Kasei Chemicals Corporation and having a styrene content of 40%.

Arkon P100 (trade name) is an alicyclic saturated hydrocarbon resin (completely hydrogenated product) available from Arakawa Chemical Industries and having a softening point (measured by a ring and ball method) of 100° C.

Arkon M100 (trade name) is an alicyclic saturated hydrocarbon resin (partially hydrogenated product) available from Arakawa Chemical Industries and having a softening point (measured by a ring and ball method) of 100° C.

Petrotack 90HM (trade name) is a hydrocarbon petroleum resin available from Tosoh Corporation and having a softening point (measured by a ring and ball method) of 88° C.

TABLE 3

| Physical Property | Unit | Measurement Standard | Polypropylene | |
|---|---|---|---|---|
| | | | Wintec WEG7T | Sun-Allomer PC480A |
| MFR | g/10 min | JIS K 7210 (1999) | 1.4 | 2 |
| Tensile Yield Strength | MPa | JIS K 7161 (1994) JIS K 7162 (1994) | 38 | 23 |
| Nominal Tensile Strain at Break | % | JIS K 7161 (1994) JIS K 7162 (1994) | 50 | >400 |
| Flexural Modulus | MPa | JIS K 7171 (2008) | 1450 | 960 |
| Charpy Impact Strength | kJ/m$^2$ | JIS K 7111 (2006) | 3.8 | 60 |
| Rockwell Hardness | HRR | JIS K 7202 (2001) | 90 | 54 |

(Evaluation)

As Examples 1 to 11 and Comparative Example 1, the obtained bending strengths and adhesive forces were evaluated as follows.

The results thereof are shown in Table 4.

(1) Bending Strength of Reinforcing Sheet for Resin Molded Product

Each of the reinforcing sheets for resin molded product of Examples 1 to 11 and Comparative Example 1 was stuck to a polypropylene plate having a thickness of 2.0 mm such that a reinforcing layer came in contact with the polypropylene plate, and heated at 80° C. for 10 minutes to achieve tight adhesive contact therebetween to thereby form a laminate body. Then, the laminate plates bodies retrieved from a drier were each trimmed into pieces each measuring 150 mm long and 25 mm wide to prepare test specimens.

The obtained test specimens were placed in the respective thermostatic baths of a universal testing machine (available from Minebea Co., Ltd.) set at the measurement temperatures (25° C., 60° C., 70° C., 80° C., and 90° C.) shown in Table 4 and, by a three point bending test, a bending strength at a displacement of 1 mm, a bending strength at a displacement of 2 mm (only when the measurement temperature was 90° C.), and a maximum bending strength (only when the measurement temperature was 90° C.) were measured for each of the test specimens.

Note that, in the three point bending test, in the universal testing machine (available from Minebea Co., Ltd.), the distance between supporting points was set to 100 mm and the center (lengthwise center and widthwise center) of each of the test specimens was pressed from the polypropylene plate side with an indenter having a diameter of 10 mm at a speed of 50 mm/min.

As Reference Example 1, a mere polypropylene plate having a thickness of 2 mm (polypropylene plate to which the reinforcing sheet for resin molded product was not stuck) was separately trimmed into pieces each measuring 150 mm long and 25 mm wide to prepare test specimens.

Thereafter, the obtained test specimens were placed in the thermostatic baths of the universal testing machine (available from Minebea Co., Ltd.) set at the measurement temperatures plate at a room temperature (25° C.). Then, the adhesive force (initial adhesive force) of the reinforcing layer to the polypropylene plate was measured.

(ii) Post-Heating Adhesive Force (without Primer Layer)

First, only the reinforcing layer of each of Examples 1 to 11 and Comparative Example 1 was stuck to a polypropylene plate at a room temperature (25° C.), and then heated at 80° C. for 10 minutes. Thereafter, the adhesive force (post-heating adhesive force) of the reinforcing layer to the polypropylene plate was measured.

B. Initial Adhesive Force (with Primer Layer)

(i) Initial Adhesive Force

First, a primer layer made of modified polypropylene and having a thickness of 10 μm was provided on the polypropylene plate.

Then, only the reinforcing layer of each of Examples 1 to 11 and Comparative Example 1 was stuck to a polypropylene plate via the primer layer at a room temperature (25° C.). Thereafter, the adhesive force (initial adhesive force) of the reinforcing layer to the polypropylene plate was measured.

TABLE 4

| | | | Exs., Com. Ex., and Ref. Ex. | | | | | | | | | | | |
|---|---|---|---|---|---|---|---|---|---|---|---|---|---|---|
| | Measurement Temperature | Displacement | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Comp. Ex. 1 | Ref. Ex. 1* |
| Bending Strength [N] (Ratio to Bending Strength in Ref. Ex. 1) | 25° C. | Displacement of 1 mm | 8.3 (5.2) | 7.8 (4.8) | 8.3 (5.2) | 7.6 (4.8) | 8.3 (5.2) | 7.8 (4.9) | 7.0 (4.3) | 8.5 (5.3) | 8.4 (5.2) | 7.7 (4.8) | 8.2 (5.1) | 6.8 (4.3) | 1.6 (—) |
| | 60° C. | Displacement of 1 mm | 3.9 (5.2) | 4.3 (5.7) | 4.3 (5.7) | 3.5 (4.7) | 3.7 (4.9) | 4.6 (6.2) | 3.9 (5.2) | 4.9 (6.5) | 4.8 (6.5) | 4.3 (5.7) | 4.7 (6.3) | 1.8 (2.4) | 0.75 (—) |
| | 70° C. | Displacement of 1 mm | 2.9 (4.9) | 3.2 (5.4) | 3.2 (5.3) | 2.6 (4.4) | 2.7 (4.6) | 3.5 (5.8) | 3.0 (5.0) | 3.5 (5.8) | 3.5 (5.8) | 3.3 (5.4) | 3.5 (5.8) | 1.2 (2.0) | 0.6 (—) |
| | 80° C. | Displacement of 1 mm | 2.2 (4.5) | 2.5 (5.0) | 2.4 (4.9) | 2.0 (4.0) | 2.0 (4.2) | 2.6 (5.3) | 2.3 (4.7) | 2.5 (5.2) | 2.5 (5.2) | 2.4 (5.0) | 2.6 (5.3) | 0.8 (1.7) | 0.49 (—) |
| | 90° C. | Displacement of 1 mm | 1.5 (3.3) | 1.8 (3.9) | 1.7 (3.7) | 1.4 (3.1) | 1.4 (3.1) | 2.1 (4.5) | 1.7 (3.7) | 2.0 (4.4) | 2.0 (4.4) | 1.9 (4.2) | 2.1 (4.5) | 0.7 (1.6) | 0.46 (—) |
| | | Displacement of 2 mm | 2.5 (3.2) | 3.1 (3.9) | 3.1 (3.9) | 2.6 (3.3) | 2.6 (3.3) | 3.9 (4.9) | 3.1 (3.9) | 3.7 (4.6) | 3.7 (4.7) | 3.5 (4.4) | 3.8 (4.8) | 1.2 (1.5) | 0.8 (—) |
| | | Maximum | 13.4 (3.7) | 14.7 (4.1) | 16.6 (4.6) | 13.7 (3.8) | 12.6 (3.5) | 15.3 (4.2) | 16.2 (4.5) | 13.5 (3.7) | 14.2 (3.9) | 15.2 (4.2) | 14.1 (3.9) | 5.4 (1.5) | 3.6 (—) |
| Adhesive Force [N/25 mm] | Initial | Without Primer Layer | 8.0 | 6.7 | 7.1 | 6.7 | 7.1 | 12.6 | 8.8 | 9.3 | 9.9 | 7.7 | 3.3 | 10.0 | — |
| | Post-Heating | | 39.0 | 25.0 | 31.8 | 31.8 | 33.5 | 15.8 | 17.0 | 13.9 | 28.5 | 28.5 | 15.4 | 20.0 | |
| | Initial | With Primer Layer | 100.0 | 69.2 | 72.8 | 89.1 | 75.1 | 61.0 | 60.0 | 66.0 | 70.0 | 68.0 | 71.0 | 80.0 | |

*Polypropylene Plate Having Thickness of 2.0 mm shown in Table 4. In the universal testing machine, the distance between supporting points was set to 100 mm and the center (lengthwise center and widthwise center) of each of the test specimens was pressed with an indenter having a diameter of 10 mm at a speed of 50 mm/min.

In this manner, a bending strength at a displacement of 1 mm, a bending strength at a displacement of 2 mm (only when the measurement temperature was 90° C.), and a maximum bending strength (only when the measurement temperature was 90° C.) were measured for the test specimens of Reference Example 1.

(2) Adhesive Force (Initial Adhesive Force and Post-Heating Adhesive Force) of Reinforcing Layer A. Initial Adhesive Force and Post-Heating Adhesive Force (without Primer Layer)

Only for the reinforcing layer formed in each of Examples 1 to 11 and Comparative Example 1, by a 90° peel test according to JIS Z0237 (2009) at a peeling speed of 300 mm/min, the initial adhesive force and post-heating adhesive force to the polypropylene plate were each measured.

(i) Initial Adhesive Force (without Primer Layer)

First, only the reinforcing layer of each of Examples 1 to 11 and Comparative Example 1 was stuck to a polypropylene While the illustrative embodiments of the present invention are provided in the above description, such is for illustrative purpose only and it is not to be construed limitative. Modification and variation of the present invention which will be obvious to those skilled in the art is to be covered by the following claims.

What is claimed is:

1. A reinforcing sheet for a resin molded product, comprising:
 a constraining layer; and
 a reinforcing layer laminated on the constraining layer,
  wherein the reinforcing layer is formed of a thermoplastic adhesive composition, the adhesive composition including polyolefin, and
  wherein, after being stuck to a polypropylene plate having a thickness of 2.0 mm and heated at 80° C. for 10 minutes, the reinforcing sheet for a resin molded product has a bending strength at a displacement of 1 mm at 90° C. which is not less than double a bending strength of the polypropylene plate having a thickness of 2.0 mm at a displacement of 1 mm at 90° C.

2. A reinforcing sheet for a resin molded product according to claim 1, wherein, after being stuck to the polypropylene plate having a thickness of 2.0 mm and heated at 80° C. for 10 minutes, the reinforcing sheet for a resin molded product has a bending strength at a displacement of 1 mm at 60 to 90° C. which is not less than triple a bending strength of the polypropylene plate having a thickness of 2.0 mm at a displacement of 1 mm at 60 to 90° C.

3. A reinforcing sheet for a resin molded product according to claim 1, wherein, after the reinforcing layer is stuck to the polypropylene plate at a room temperature, the reinforcing sheet for a resin molded product has an adhesive force to the propylene plate which is measured by a 90° peel test according to JIS Z0237 (2009) at a peeling speed of 300 mm/min to be not less than 3.0 N/25 mm.

4. A reinforcing sheet for a resin molded product according to claim 1, wherein, after the reinforcing layer is stuck to the polypropylene plate at a room temperature and heating is performed at 80° C. for 10 minutes, the reinforcing sheet for a resin molded product has an adhesive force to the propylene plate which is measured by a 90° peel test according to JIS Z0237 (2009) at a peeling speed of 300 mm/min to be not less than 10.0 N/25 mm.

5. A reinforcing sheet for a resin molded product according to claim 1, wherein the adhesive composition contains a hydrogenated product of a polymer of a monomer containing a conjugated diene.

6. A reinforcing sheet for a resin molded product according to claim 5, wherein a blending ratio of the polyolefin based on 100 parts by mass of the hydrogenated product is in a range of 10 to 200 parts by mass.

7. A reinforcing sheet for a resin molded product according to claim 1, wherein the adhesive composition further contains a tackifier.

8. A reinforcing sheet for a resin molded product according to claim 7, wherein the tackifier contains an alicyclic saturated hydrocarbon resin.

9. A reinforcing sheet for a resin molded product according to claim 7, wherein a blending ratio of the tackifier based on 100 parts by mass of the hydrogenated product is in a range of 40 to 200 parts by mass.

10. A structure for reinforcing a resin molded product in which a reinforcing sheet for a resin molded product is stuck to a resin molded product to reinforce the resin molded product,
wherein the reinforcing sheet for a resin molded product includes a constraining layer, and a reinforcing layer laminated on the constraining layer,
wherein the reinforcing layer is formed of a thermoplastic adhesive composition, the adhesive composition including polyolefin, and
wherein, after being stuck to a polypropylene plate having a thickness of 2.0 mm and heated at 80° C. for 10 minutes, the reinforcing sheet for a resin molded product has a bending strength at a displacement of 1 mm at 90° C. which is not less than double a bending strength of the polypropylene plate having a thickness of 2.0 mm at a displacement of 1 mm at 90° C.

11. A structure for reinforcing a resin molded product according to claim 10, wherein the reinforcing sheet for a resin molded product stuck to the resin molded product is heated to a temperature of not less than 80° C. to bring the reinforcing sheet for a resin molded product into tight adhesive contact with the resin molded product.

12. A structure for reinforcing a resin molded product according to claim 10, wherein, after a primer layer is provided on the resin molded product, the reinforcing sheet for a resin molded product is stuck to the resin molded product via the primer layer.

13. A structure for reinforcing a resin molded product according to claim 10, wherein the reinforcing sheet for a resin molded product is heated in advance to a temperature of not less than 80° C. and then stuck to the resin molded product.

* * * * *